Figure 1:
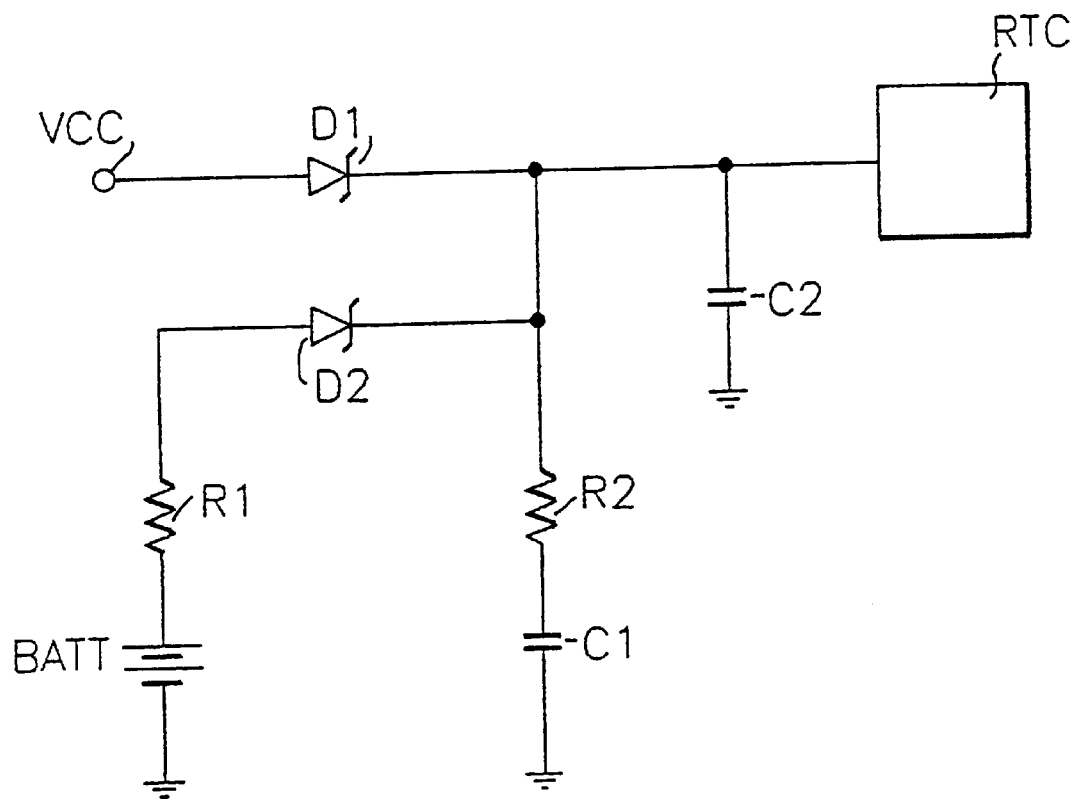

United States Patent
Yeh

[19]
[11] Patent Number: 5,905,365
[45] Date of Patent: May 18, 1999

[54] REAL TIME-CLOCK POWER SUPPLY DEVICE

[75] Inventor: Henry Yeh, Chung-Li, Taiwan

[73] Assignee: Twinhead International Corp., China

[21] Appl. No.: 08/959,334

[22] Filed: Oct. 28, 1997

[51] Int. Cl.[6] .................................. H02J 7/12; H02J 7/00
[52] U.S. Cl. ............................................. 320/166; 307/66
[58] Field of Search .................................... 320/166, 167; 307/66, 109

[56] References Cited

U.S. PATENT DOCUMENTS

| | | | |
|---|---|---|---|
| 4,399,524 | 8/1983 | Muguruma et al. | 365/229 |
| 4,591,666 | 5/1986 | Boeckmann | 379/351 |

Primary Examiner—Peter S. Wong
Assistant Examiner—Gregory J. Toatley, Jr.
Attorney, Agent, or Firm—Ostrolenk, Faber, Gerb & Soffen, LLP

[57] ABSTRACT

A real-time clock (RTC) power supply device in which a power supply of a RTC is connected to a capacitor having a large capacity. The power supply of a computer system charges the capacitors by RC charging when the computer is booted. After the computer is turned off, the power stored in the capacitor is provided to the RTC, the time of power consumption by the cell is decreased, and the life of the cell is extended. The RTC power supply device comprises a first diode, a filter capacitor, a charging loop, and a battery branch.

3 Claims, 1 Drawing Sheet

REAL TIME-CLOCK POWER SUPPLY DEVICE

FIELD OF THE INVENTION

This invention relates to a RTC power supply device, and particularly to a circuit in which the power supply of the RTC is connected to a capacitor having a large capacity. The life of the cell is extended by the charge power in the capacitor.

BACKGROUND OF THE INVENTION

On a computer mother board, a RTC(Real-Time Clock)is provided to maintain the data stored in a CMOS on the mother board. Generally, electrical power is provided to a RTC by a battery arranged on the mother board. The battery can be a lithium cell, a nickel/hydrogen cell or a nickel/cadmium cell, an exterior cell box, or a RTC module of with an internal cell. The only method of extending the life of the power supply is to use a battery having excellent efficiency. Although the power consumption of the CMOS is low, the battery's power will eventually be used up. According to statistics, if a computer has never been turned on, the life the battery is from about a half year to one year. But in fact, the normal service life of a lithium cell is 10 years. When the power of the battery is too low or is used up, the data in the CMOS cannot be maintained, and thus, the computer cannot be. The battery must then be changed. A regular user may not know the function or existence of the battery. When the computer cannot be smoothly booted, the user probably thinks the quality of the computer is bad. A computer repair technicians is called to repair the computer. Frequently the results of repairing the computer is to replace the battery with a new one because the electrical capacity of the old battery is depleted. After a new battery is mounted, the data in the CMOS must be set anew, which will bother the user and increase maintenance cost. The method of providing power to the RTC should be improved.

SUMMARY OF THE INVENTION

It is an object of this invention to provide a RTC power supply device for a computer system, wherein a power supply of the RTC is connected to a capacitor having a large capacity. The power supply of the computer system charges the capacitor when the computer is booted by means of RC charging. After the computer is turned off, the power stored in the capacitor is provided to the RTC. The time in which the battery's power is decreased, therefore, the life of the battery is extended.

BRIEF DESCRIPTIONS OF THE DRAWING

FIG. 1 is a circuit diagram of a RTC power supply device of the present invention.

DETAILED DESCRIPTIONS OF THE INVENTION

As shown in FIG.1, a RTC power supply device of the present invention comprises a first diode D1 which is connected between a system power supply VCC and an input of a RTC, a filter capacitor C2 which is connected between the ground and a node placed between the first diode D1 and the input of the RTC, a charging loop comprising a second resistor R2 and a first capacitor C1, the loop being connected between the node and the ground, and a battery branch connected to the node between the first diode D1 and the input of the RTC power and which comprises a battery BATT, a first resistor R1, and a diode D2 connected in series.

In one preferred embodiment of the present invention, a system power supply VCC is connected to a power input of a RTC via a Schottky diode D1. A battery branch comprises a battery BATT, a resistor R1 and a Schottky diode D2. The positive pole of the battery BAT is connected in series to a resistor R1 and a Schottky diode D2, and is coupled to the power input of the RTC. The power input of the RTC is connected in parallel to a charging loop comprising a branch filter capacitor C2 and a resistor R2, and a capacitor C1 connected in series.

When the computer is booted, the system power supply VCC provides power to the RTC, and simultaneously the capacitor C1 is charged via the resistor R2. Generally, the voltage level of the system power supply VCC is higher than that of battery BAT, thus, diode D2 is not turned on and thereby prevents current from flowing back to the battery BAT. The diode D2 protects the battery BAT which in general, is, a lithium cell that cannot be char ged due to the fact that if the lithium cell is forced to be charged, it might explode. At the time the computer is turned off, the capacitor C1 is, in general, charged to a voltage level substantially equal to that of the power supply VCC and thus is higher than the level of the battery BAT. Therefore , the diode D2 is off and the power stored in the capacitor C1 is provided to the RTC. Only when the voltage level of capacitor C1 is lower than the sum of voltage of battery BAT, forward biasing voltage of the diode D2, and the voltage drop across the resistor R1, the battery can directly provide power to the RTC. In other words, only in this condition is the power of the battery consumed.

The discharge time of the capacitor C1 is controlled by the capacity of the capacitor C1 and the resistance of the resistor R2. With a careful control, the desired power retaining time of the battery can be obtained. When the voltage level of battery BAT is too low or a new battery is required, the power stored in the capacitor C1 can maintain a considerable discharge time, i.e. after the battery BAT is removed from computer, the data stored in the CMOS will not disappear. The data need not to be set anew. The maintenance of the computer can be simplified. The RTC power supply device facilitates the replacement of the battery.

upon turning on the computer, the system power supply VCC charges the capacitor C2. The discharge time of capacitor C2 can be several hours to several days, depending on the discharge characteristics curve based on the resistance of the resistor R2 and the capacity of the capacitor C1. If a user utilizes the computer everyday, the power needed by the RTC is substantially provided by the discharge of the capacitor C1, rather than the battery BAT. In this way, the power of battery BAT can be preserved, and the service life of the battery BAT is increased.

We claim:

1. A real-time clock power supply device comprising:

a real time clock having a power input;

a first diode connected between a system power supply and the power input of the real-time clock;

a node between the first diode and the power input of the real-time clock;

a filter capacitor connected between the node and ground;

a charging loop comprising a second resistor and a first capacitor, the loop being connected between the node and ground;

a battery branch connected between the node and ground, the battery branch comprising a battery BATT, a first resistor R1 and a second diode all serially connected.

2. The real-time clock power supply device as claimed in claim 1, wherein the first diode is a Schottky diode.

3. The real-time clock power supply device as claimed in claim 1, wherein the second diode is a Schottky diode.

* * * * *